United States Patent
Perrinot (10) Patent No.: US 9,053,328 B2
(45) Date of Patent: Jun. 9, 2015

(54) METHOD OF ANALYZING THE BEHAVIOR OF A SECURE ELECTRONIC TOKEN

(75) Inventor: Olivier Perrinot, Austin, TX (US)

(73) Assignee: GEMALTO SA, Meudon (FR)

( * ) Notice: Subject to any disclaimer, the term of this patent is extended or adjusted under 35 U.S.C. 154(b) by 51 days.

(21) Appl. No.: 13/821,610

(22) PCT Filed: Aug. 25, 2011

(86) PCT No.: PCT/EP2011/064677
§ 371 (c)(1),
(2), (4) Date: Apr. 30, 2013

(87) PCT Pub. No.: WO2012/031905
PCT Pub. Date: Mar. 15, 2012

(65) Prior Publication Data
US 2013/0219494 A1    Aug. 22, 2013

(30) Foreign Application Priority Data

Sep. 10, 2010   (EP) ..................... 10305973

(51) Int. Cl.
*G06F 21/55*   (2013.01)
*G06F 21/60*   (2013.01)
*G06F 21/77*   (2013.01)
(Continued)

(52) U.S. Cl.
CPC .............. *G06F 21/60* (2013.01); *G06F 21/55* (2013.01); *H04L 63/30* (2013.01); *G06F 21/552* (2013.01); *G06F 21/77* (2013.01); *H04L 63/1425* (2013.01); *G06F 2221/2101* (2013.01); *G06F 2221/2115* (2013.01); *G06F 2221/2107* (2013.01); *H04W 12/12* (2013.01)

(58) Field of Classification Search
None
See application file for complete search history.

(56) References Cited

U.S. PATENT DOCUMENTS

| 2008/0182621 | A1 | 7/2008 | Morman |
| 2008/0214186 | A1* | 9/2008 | Bizzarri et al. ............... 455/425 |
| 2009/0254465 | A1* | 10/2009 | Oester ............................. 705/34 |

(Continued)

FOREIGN PATENT DOCUMENTS

| EP | 1094423 A2 | 4/2001 |
| EP | 2124422 A1 * | 11/2009 |
| WO | WO 01/58192 A1 | 8/2001 |

OTHER PUBLICATIONS

International Search Report (PCT/ISA/210) issued on Jan. 30, 2012, by the European Patent Office as the International Searching Authority for International Application No. PCT/EP2011/064677.

(Continued)

*Primary Examiner* — David Pearson
(74) *Attorney, Agent, or Firm* — Buchanan Ingersoll & Rooney PC (57) ABSTRACT

The invention is a method of analyzing the behavior of a secure electronic token which comprises an interface for exchanging data with an external entity. The token has a lifecycle wherein the token is intended to be created then issued. The method comprises the steps of:
loading and installing a dedicated application into the token after the electronic token has been issued,
spying the data exchanged through the interface and providing the dedicated application with these exchanged data,
generating a buffer from the exchanged data by the dedicated application,
sending the buffer to an external machine.

18 Claims, 3 Drawing Sheets

(51) Int. Cl.
*H04W 12/12* (2009.01)
*H04L 29/06* (2006.01)

(56) References Cited

U.S. PATENT DOCUMENTS

2009/0275307 A1* 11/2009 Kahn .................. 455/404.1
2009/0325615 A1* 12/2009 McKay et al. ................ 455/466

OTHER PUBLICATIONS

Written Opinion (PCT/ISA/237) issued on Jan. 30, 2012, by the European Patent Office as the International Searching Authority for International Application No. PCT/EP2011/064677.

* cited by examiner

METHOD OF ANALYZING THE BEHAVIOR OF A SECURE ELECTRONIC TOKEN

FIELD OF THE INVENTION

The present invention relates to methods of analyzing the behavior of a secure electronic token. It relates particularly to methods of auditing the incoming and outgoing data of a secure electronic token.

PRIOR ART

Electronic tokens are portable electronic devices with limited resources. In general, electronic tokens comprise a plurality of memories of different type. For example, they may comprise memory of RAM, ROM, EEPROM or Flash type. Smart cards and particularly Universal Integrated Circuit Cards (UICC) are secure electronic tokens. A secure electronic token is usually connected to a host machine which provides power and a graphical user interface.

In general, a secure electronic token follows a usual lifecycle where the token is first physically built through one or several steps. Then a specific operating system is written in a non volatile memory of the token. When the kind of use of the token is known, a first set of personalization data may be downloaded into the token. When the end-user is known, a second set of personalization data may be downloaded into the token. This second set is customized according to the end-user requirements. Then the token is issued. After this step of issuance, the token may be upgraded with additional data like a new application, a new application version or applicative data.

More and more complex applications are developed and then are embedded in secure electronic tokens. Such applications may be dedicated to banking services, access services, gaming, or any kind of services. In general these applications are designed for communicating with a remote application server. Very often the applications involve several components whose type may greatly vary. For example, an application may require different types of distant servers, different network for accessing these distant servers, different communication protocols and different host machines where the tokens are connected. For instance a SIM card may be used with many types of mobile phones and a payment card may be used with a large number of different payment machines.

Before the deployment phase, these applications are tested and validated. Unfortunately, unexpected behaviors of these applications may occur on the field. These unexpected behaviors may be due to bugs into the applications, bugs into the operating system of the token, incompatibility of involved hardware components, bugs into the servers, or even illogical behavior of the end-user.

When a secure electronic token is deployed on the field, the monitoring of the behavior of this token is difficult.

It is known to monitor command counters in the secure electronic tokens in order to provide monitoring data. By getting the command counters value, an analysis of the use of the token may be performed. Nevertheless, such counters may provide insufficient data and the analysis may fail to detect the root cause of the issue. The mechanism of command counter management is initialized before or during the personalization stage of the token. This mechanism is frozen and cannot be adapted to a particular issue.

When an issue is detected for a token on the field, the analysis needs to have pieces of information related to all involved components. For many cases, only suppositions can be done on these components: server application, token application, token operating system, user's behavior, host machine behavior and network behavior. Thus investigations may easily become extremely arduous, costly and time consuming.

As a consequence, there is a need to be able to customize the monitoring data which may be provided by a secure electronic token. In particular, it is important to be able to get customized monitoring data even if the token has been issued and deployed on the field.

SUMMARY OF THE INVENTION

An object of the invention is to solve the above mentioned technical problems.

The object of the present invention is a method for analyzing the behavior of a secure electronic token which comprises a communication interface for exchanging data with an external entity. The secure electronic token has a lifecycle wherein the secure electronic token is intended to be created then issued. The method comprises the steps of:

a) loading and installing a dedicated application into the secure electronic token, b) generating a buffer, c) sending the buffer to an external machine.

The loading and installing step is performed after the secure electronic token has been issued. The method comprises the step of:

d) spying the data exchanged through the communication interface and providing the dedicated application with the exchanged data. The buffer is generated from the exchanged data by the dedicated application.

Advantageously, the method may comprise the step of analyzing the buffer in an external machine in order to determine how the secure electronic token is used.

In a preferred embodiment, the buffer may comprise a subset of the data exchanged through the communication interface.

Advantageously, the step of sending the buffer may be automatically started when the buffer reaches a preset threshold.

In a preferred embodiment, the spying step may be performed by a specific means which is automatically activated when the dedicated application is loaded or installed into the secure electronic token.

In one embodiment, the spying step may be performed by a specific means which is automatically deactivated when the dedicated application is removed from the secure electronic token.

In one embodiment, the spying step may be performed by a specific means which is activated by a first command received on the communication interface and/or deactivated by a second command received on the communication interface.

Another object of the invention is a secure electronic token comprising a communication interface for exchanging data with an external entity. The secure electronic token has a lifecycle wherein the secure electronic token is intended to be created then issued. The secure electronic token is able to load and to install a dedicated application and comprises a specific means which is adapted to spy on the data exchanged through the communication interface. The specific means is adapted to provide the dedicated application with said exchanged data only if the dedicated application has been installed into the electronic token.

Advantageously, the secure electronic token may comprise an operating system and this operating system may comprise the specific means.

In one embodiment, a buffer may be generated by the dedicated application from the data exchanged through the communication interface and the dedicated application may comprise an exporting means capable of requesting the sending of the buffer to an external machine.

Advantageously, the dedicated application may comprise a checking means capable of detecting that the buffer has reached a preset threshold.

In one embodiment, the specific means may be automatically activated when the dedicated application is loaded or installed into the secure electronic token.

In one embodiment, the specific means may be automatically deactivated when the dedicated application is removed from the secure electronic token.

Advantageously, the specific means may comprise a preset identifier of the dedicated application.

In one embodiment, the secure electronic token may be a UICC or a token which comprises SIM features.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure electronic token able to exchange data with a distant machine by means of a communication channel. In particular, the secure electronic token may be a Universal Integrated Circuit Card (UICC), a SIM card, or a Machine-To-Machine (M2M) token connected to a wireless device which provides means for establishing a communication channel between a distant machine and the secure electronic token. In the examples of this specification, the secure electronic token is a SIM card but it could be any other kind of secure electronic token comprising both a non volatile memory and means for exchanging data with a distant machine. The token may also be a UICC card or a USB token connected to a personal computer.

The invention relies on the combination of a spying means able to spy data received/sent by the token and a customized application. The spying means is able to give all data which are received by the token to the customized application. The customized application is developed according to a specific type of the analysis which targets a particular issue. The customized application is adapted to select a subset of the data provided by the first means. Thus only data which are relevant for the analysis are stored in the token and sent to an external machine for a further analysis.

The invention is especially well suited for secure electronic tokens intended to be used in the Telecom domain and M2M domain. An advantage of the invention is to allow a token analysis without requiring extraction of the token from the connected host machine. Thanks to the invention, no physical access to the token is required.

The invention allows determining the root default when an issue occurs on a token deployed on the field. In particular, the invention provides a way to check if the main issue comes from the token itself or comes from the use of the token by the deployed infrastructures and applications.

Figure 1:
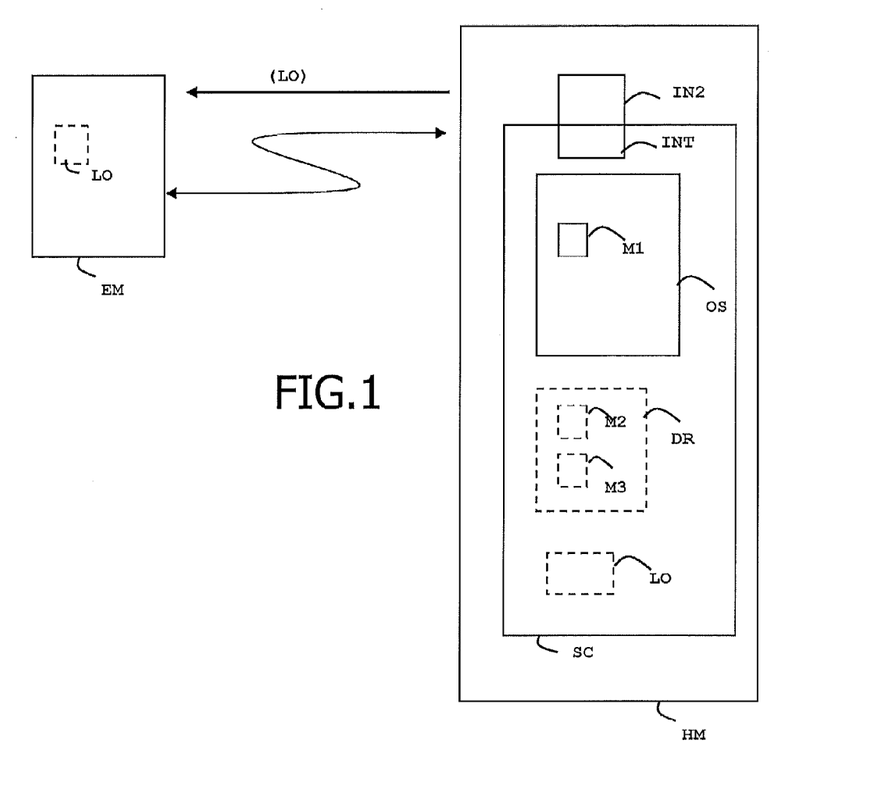
FIG. 1 is an example of a system comprising a remote machine and a host machine comprising a secure electronic token according to the invention.

FIG. 1 shows an example of system comprising a distant machine EM, and a host machine HM comprising a secure electronic token SC according to the invention.

The distant machine EM is also called an external machine or a remote machine. The distant machine EM may be a server able to exchange data with the secure electronic token SC through the host machine HM. The host machine HM may be a mobile phone or any device able to connect a secure electronic token and to communicate with the distant machine EM. In this example, the secure electronic token SC is a SIM card. The distant machine EM is able to exchange data with the token SC thanks to wireless channel which may be the Over The Air mechanism—known as OTA—defined by the GSM 03.40, GSM 03.48 and/or ETSI/SCP—3GPP—3GPP2 standards. The remote connection between the distant machine EM and the token SC may use the Short Message Service (SMS) or the Bearer Independent Protocol (BIP) as a bearer.

The distant machine EM may belong to the material infrastructure of a mobile network operator (MNO). The material infrastructure is the mobile network of the MNO. This infrastructure allows exchanging data with SIM smart cards on the field.

Alternatively, the distant machine EM may be a server able to exchange data by means of a network channel, in particular through the Internet or any wire links. In such a case, the host machine HM may have communication means allowing a wire link.

Alternatively, the host machine HM may be a M2M device box, a personal computer, a payment terminal or any machine allowing establishing a communication channel with the distant machine EM.

The host machine HM comprises a communication interface IN2 allowing to communicate with a connected token SC. The token SC comprises a communication interface INT intended to connect the host machine HM. The token SC comprises an operating system OS. This operating system OS comprises a specific means M1 which is adapted to spy on the data exchanged through the communication interface INT.

The token SC is intended to comprise a dedicated application DR which is not present at the time of the issuance of the token. The dedicated application DR is capable of generating a buffer LO which is stored into the token SC. The dedicated application DR comprises an exporting means M2 which is able to request the sending of the content of the buffer LO to the external machine EM. The dedicated application DR comprises a checking means M3 which is able to detect that the size of the buffer LO content has reached a preset threshold. In a preferred embodiment, the exporting means M2 is triggered by the checking means M3. Alternatively, the exporting means M2 may be triggered by any preset event. Such preset event may be a preset duration, a number of commands stored into the buffer, a predefined combination of commands spied on the interface INT or any relevant particular events.

The specific means M1 is adapted to provide the dedicated application DR with all the data exchanged through the communication interface INT only if the dedicated application DR is active into the electronic token SC. The specific means M1 may spy on the exchanged data either directly through the communication interface as such or via the operating system of the token.

The specific means M1 does send the raw spied data to the dedicated application DR. The specific means M1 does not sort the spied data.

Figure 2:
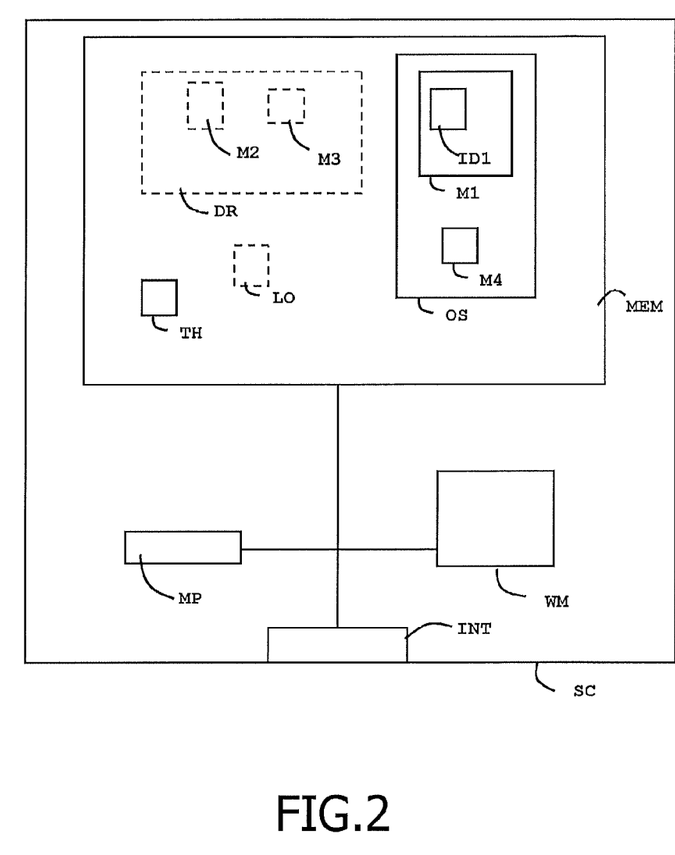
FIG. 2 depicts schematically the architecture of a secure electronic token according to the invention.

FIG. 1 and FIG. 2 contain several elements that are drawn with dotted line. These elements are created after the issuance of the token SC.

FIG. 2 shows an example of architecture of a SIM card as an example of a secure electronic token according to a preferred embodiment of the invention. The SIM card SC contains a microprocessor MP, a communication interface INT, a non volatile memory MEM, and a working memory WM. The working memory may be a RAM. The communication interface INT is intended to connect a host machine and allows exchanging data with the connected host machine.

In a preferred embodiment, the connected host machine is a mobile phone.

The memory MEM may be an EEPROM or a Flash memory. The memory MEM contains an operating system OS and a threshold TH. The operating system comprises a specific means M1 which is adapted to provide the dedicated application DR with all the data exchanged through the communication interface INT only if the dedicated application DR is active into the SIM card SC. The specific means M1 comprises an identifier ID1. The identifier ID1 allows to reach the dedicated application DR which is intended to be installed into the token SC.

The memory MEM is intended to comprise a dedicated application DR and buffer LO.

The dedicated application DR is able to store data in the buffer LO. In a preferred embodiment, the buffer LO is filled in a sequential manner. Thus the chronological order of the events is kept into the buffer LO.

In the example of FIG. 2, the dedicated application DR comprises an exporting means M2 and a checking means M3.

The exporting means M2 is able to send the content of the buffer LO to the remote machine EM.

The checking means M3 is able to detect that the amount of data stored in the buffer LO reached the preset threshold TH. For example, the means M3 may be able to detect that the buffer LO is full.

In the example of FIG. 2, the token comprises a means M4 which is able to activate and/or to deactivate the specific means M1. In a preferred embodiment the operating system OS comprises the means M4.

In the example of FIG. 2, the memory MEM is implemented as a unique non volatile memory. The memory MEM may also be implemented as any combination of several non volatile memories of different types.

Alternatively, the buffer LO may be stored in a volatile memory. For example the buffer LO may be stored in RAM. In this case one must take care of sending the buffer content before it is lost.

The operating system OS may comprise a virtual machine, in particular a Java® virtual machine or a .Net® virtual machine.

The microprocessor MP cooperates with the working memory WM and is intended to run the operating system OS. The two means M1 and M4 may be either software applications run by the microprocessor MP or hardware designed. These two means may be implemented as two distinct elements or merged in one or several elements.

According to the invention, an example of embodiment of the method of analyzing the behavior of the secure token SC comprises several steps.

First a secure electronic token SC is built. Then the token SC is issued. Then the token SC is connected to a host machine (e.g. a Telecom handset if case of a SIM card). At this time, the token SC comprises the specific means M1 which is not activated. The token SC may be used normally.

If a particular failure occurs when using the token SC, a dedicated application DR must be developed. The dedicated application DR must be created according to the targeted particular failure. The dedicated application DR must be designed so as to generate a selective log which is stored into the bugger LO. For example, the dedicated application DR may store the Terminal profile commands only. In another example, the dedicated application DR may only store the commands which are related to payment transactions. In another example, the dedicated application DR may record only commands related to a given application embedded in the token. (Assuming that the token embeds a plurality of different applications.)

Then the dedicated application DR is downloaded into the token SC. The dedicated application DR is then installed. At this point, the dedicated application DR is in the activate state. In a preferred embodiment, the means M4 of the host machine HM automatically activates the means M1 when the dedicated application DR becomes installed.

Now all data exchanged between the token SC and the host machine HM through the communication interface INT are forwarded by the means M1 to the dedicated application DR. These forwarded data are also called spied data. The dedicated application DR selects the targeted spied data and generates a subset of the targeted spied data. The targeted spied data is also called tracked data. The dedicated application DR stores this subset into the buffer LO.

The subset of the spied data is generated by keeping a part of the whole spied data. The subset may be generated by selecting data according to the type of data, the value of the data, the recipient of the data or the issuer of the data. Advantageously, the subset may be generated by selecting data according to the date/time or according to the type of application activated in the token. In one example, the dedicated application DR may keep only command belonging to a given list. In another example, the dedicated application DR may keep outgoing data only. (or incoming data only). In another example, the dedicated application DR may keep data related to a targeted application embedded into the token. In another example, the dedicated application DR may keep data coming from or going to a specific application server only. In another example, the dedicated application DR may keep data which do not go out of the host machine connected to the token. In other words, the dedicated application DR may keep only data that are generated by the host machine or received by the host machine for its internal use.

Figure 3:
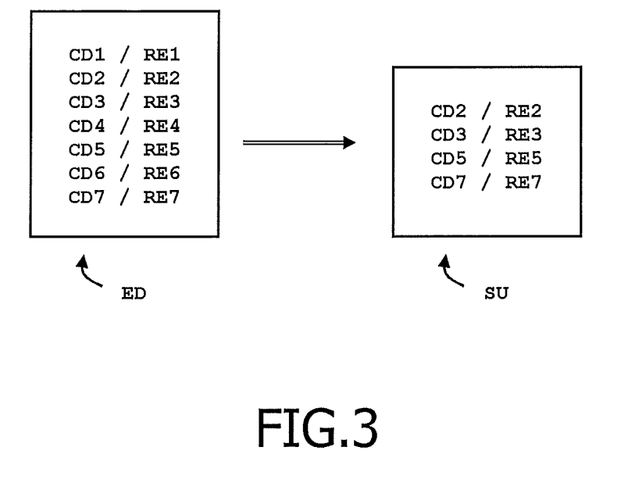
FIG. 3 shows an example of the list of couple commands/responses received by a secure electronic token and a corresponding log generated according to the invention.

FIG. 3 shows an example of a set ED of seven commands/responses which are spied by the means M1. As show at FIG. 3, the dedicated application DR generates a subset SU of four commands/responses which are recorded into the buffer LO. More precisely, the means M1 sends to the dedicated application DR a first command CD1 and its corresponding response RE1, a second command CD2 and its corresponding response RE2, CD3/RE3, CD4/RE4, CD5/RE5, CD6/RE6 and a seventh command CD7 and its corresponding response RE7. The dedicated application DR selects the subset SU of command/response CD2/RE2, CD3/RE3, CD5/RE5 and CD7/RE7 according to its internal criteria. The dedicated application DR stores this subset SU into the buffer LO.

For example, the selected commands may be SIM Tool Kit (STK) commands like RunGSMAlgo, Authenticate, UpdateFile, or Envelope.

In another example, the selected data may be proactive commands sent by the SIM to the handset like "Display Text" and "Send SMS". The selected data may also be events sent by the handset to the SIM like "Call connected" and "Location change".

In a further example, the selected data may be a set of commands which are used in the banking domain. For instance, the selected data may be EMV commands like "GenerateAC", "GetProcessingOptions", "ChangePIN", and "UnblockPIN".

Periodically, the checking means M3 of the dedicated application DR verifies the size of the buffer LO content. If the amount of data stored into the buffer LO reaches the preset threshold TH, the exporting means M2 is triggered. The exporting means M2 initiates the sending of the buffer LO content to a predefined remote machine EM. For example, the exporting means M3 may ask the operating system OS to send the buffer LO content to the external machine EM. The buffer sending may be performed through the SMS mechanism when the token is a UICC or a SIM card. This sending initiated by the dedicated application DR is well known from a person skilled in the art. The buffer LO content is sent to the remote machine EM through the connected host machine HM.

Advantageously, the remote machine EM may request an update of the threshold TH which is used for managing the buffer sending.

In one example, the buffer LO may be sent when the amount of data stored in the buffer is at least equal to 1 000 bytes. This threshold amount may depend on the free space available in the token. Advantageously, the threshold amount may be configurable with a dedicated command. According to another example, the buffer LO may be sent when the buffer is full at 80%. Alternatively, the buffer sending may be automatically started when the number of commands logged into the buffer LO reaches a preset threshold. For example, the buffer content may be sent when the buffer contains at least 100 or 500 tracked data.

When the remote machine EM has received enough data coming from the buffer LO, a specific command may be sent to the token SC in order to stop the dedicated application DR. This stopping step may be performed either by deactivating the specific means M1 or by deactivating the dedicated application DR as such.

The deactivating of the specific means M1 may also be performed thanks to the means M4 which may be able to deactivate the specific means M1.

Alternatively, this stopping step may be performed by uninstalling or removing the dedicated application DR from the token SC.

In one embodiment, the specific means M1 comprises an identifier ID1 of the dedicated application DR. Thus the specific means M1 uses the identifier ID1 for accessing the dedicated application DR. Advantageously, the identifier ID1 may have a preset value.

By default the spying of exchanged data may be automatically activated. In other words, the sending of spied data by the specific means M1 is automatically started when the dedicated application DR is activated into the electronic token SC.

The dedicated application DR may be downloaded into one or several tokens which are on the field.

Advantageously, the dedicated application DR may be designed so as to comprise selecting rules. The selecting rules select (or not) the spied data which are relevant for the targeted issue analysis. A person skilled in the art of token application is able to design such selecting rules.

Advantageously, the dedicated application DR may be designed so as to comprise coding rules. The coding rules aim at translating the selected spied data by using a specific syntax before storing the translated data into the buffer LO. These coding rules may also extract particular pieces of information from the selected spied data. Thus these coding rules allow reducing the memory size that is required for storing the data in the buffer. These coding rules may allow keeping only essential elements belonging to the selected spied data. For example, when the selected spied data is an APDU command, the header may be replaced with a one-byte identifier. Thus the four bytes of the header, as defined by the ISO7816 standard, are replaced by a single byte. A person skilled in the art of token application is able to design such coding rules.

Advantageously, the content of the buffer LO may be compressed before the storing of data or before the sending of the buffer content.

Advantageously, the remote machine EM may request an update of the threshold TH which is used for managing the buffer sending.

The buffer content may be got by the remote machine EM either in push or pull mode. A specific command may be used for requesting the buffer sending. In other words, the token SC may make the decision to send the buffer content to the distant server EM or the distant server EM may request the buffer content from the token SC. In this last case, the exporting means M2 may make the decision to send the buffer content according to the threshold value.

Alternatively, the buffer LO may be sent at each boot phase of the secure token.

When the remote machine EM has received enough data coming from the buffer LO, the analysis of the spied data may be carried out. The analysis may be automatically or manually performed. The analysis of the buffer content aims at determining the behavior and the usage of the token SC. For example a sequence of operations which stress the token SC may be retrieved from the buffer LO content.

Advantageously, the analysis of the buffer LO may conclude that the token is incorrectly used by the end user. In such a case, an alert message may be sent to the end user of the token or to any relevant authority.

Thanks to the invention, it is possible to launch a deep analysis of the applications which use the secure token even if a non predictable combination of applicative commands is sent to the token. Generally, the applications which use the secure token are stored in a machine HM connected to the token. This connected machine HM may be a wireless device BOX, a mobile phone or any computer able to exchange data with the token.

Advantageously, the buffer content may be ciphered with a key into the token and deciphered into the distant machine EM. A secret key may be shared by both the token and the machine EM. Alternatively, the token and the machine EM may use a Public key/Private key pair.

Thanks to the invention, the root cause of a secure electronic token issue may be retrieved. The invention allows detecting a failure coming from any devices/machines involved in the usual running of the token. In particular, the invention allows identifying issues coming from abnormal network interactions, from abnormal behavior of the connected device (e.g. mobile phone or wireless module or any device intended to connect the token), from abnormal behavior of the applications (either running in connected host machine HM or in the token itself), from abnormal behavior of the end user, and from the token chip quality.

Advantageously, several distinct dedicated applications may be developed for targeting a single failure on a given set of deployed tokens. Thus several buffers may be retrieved by the distant machine EM and the analysis may crosscheck these buffers.

An advantage of the invention is to provide a flexible solution which may accurately focus on a targeted type of data exchanged between the token and the connected host machine.

Thanks to the invention, no interaction is needed with the end user.

The invention may be implemented in secure electronic tokens dedicated to the Machine to Machine (M2M) domain. The M2M domain uses wireless modules which are integrated in systems for providing M2M communicating services. The wireless modules may comprise secure electronic tokens such as SIM cards. The invention may be implemented in M2M tokens which are used in cars, automatic vending machines and drinks machines.

The lifespan of a token may depends on the use of the non volatile memory embedded in the token. In order to estimate the future lifespan of a secure electronic token, a mission profile may be associated to a token. Such a mission profile is intended to reflect the future use of the token. Usually, the mission profile is built by estimating the number of applicative commands which are supposed to be executed by the token. Thanks to the invention, the type and the number of commands received by the token is known. By knowing the pieces of information it may be then possible to compute an estimated lifespan for a token. This computation takes into account the memory wear due to the treatment of each type of command. For example the mission profile may be based on the assumption that three "authenticate" commands, two "select file" commands and four "update file" commands are executed on a daily basis. The assessment may also be computed on a monthly or yearly basis. The assessment of the token lifespan is important since the token issuer may have to commit on a fixed token lifespan. In particular, all issues related to the token lifespan may be treated by a contractual guarantee.

The invention allows to get information about the use of a token which is already deployed on the field. Thus the mission profile of the token may be built, updated or confirmed.

Advantageously, the type or identifier of the connected host machine may be sent to the remote machine EM with the buffer LO.

The invention also applies to secure electronic tokens which have a wireless communication interface for exchanging data with a host machine. In other words, the token may connect the host machine though a wireless communication interface.

Advantageously, the running of the dedicated application DR may be secured thanks to usual security mechanisms like authentication, key, secret code, and the like.

The invention claimed is:

1. A method of analyzing the behavior of a secure electronic token, said electronic token functioning as a smart card and comprising a communication interface for exchanging data with an external entity, said electronic token having a lifecycle wherein said token is created then issued, said method comprising the steps of:
   a) loading and installing a dedicated application into the electronic token subsequent to the issuance of said electronic token,
   b) spying upon all the data exchanged through the communication interface by a specific means that was embedded in said electronic token prior to issuance of said electronic token,
   c) forwarding, by the specific means, to the dedicated application all said spied data,
   d) generating, by the dedicated application, a buffer from all the spied data according to the type of use of said spied data; and
   e) sending the buffer to an external machine.

2. The method according to claim 1, wherein said method further comprises the step of:
   f) analyzing the buffer in the external machine in order to determine how the electronic token is used.

3. The method according to claim 1, wherein said buffer comprises a subset of the exchanged data.

4. The method according to claim 1, wherein the step of sending the buffer is automatically started when the buffer reaches a preset threshold.

5. The method according to claim 1, wherein said specific means is automatically activated when the dedicated application is loaded or installed into the electronic token.

6. The method according to claim 1, wherein said specific means is automatically deactivated when the dedicated application is removed from the electronic token.

7. The method according to claim 1, wherein said specific means is activated by a first command received on the communication interface and/or deactivated by a second command received on the communication interface.

8. The method of claim 1 wherein the specific means, which was embedded in the electronic token prior to issuance of said electronic token, is in an inactive state until the loading and installing of the dedicated application into the electronic token.

9. The secure electronic token according to claim 1, wherein the loading and installing of said dedicated application into the electronic token occurs subsequent to a detection of a fault.

10. A secure electronic token functioning as a smart card and comprising a communication interface for exchanging data with an external entity, said electronic token having a lifecycle wherein said token is created then issued, said electronic token being configured to load and to install a dedicated application subsequent to the issuance of the electronic token, wherein said secure electronic token comprises:
   a specific means (i) which was embedded in the electronic token prior issuance of the electronic token and (ii) is configured to spy on all the data exchanged through the communication interface, said specific means being configured to forward all said spied data to the dedicated application only when said dedicated application has been installed into the electronic token and wherein the dedicated application is configured to generate a buffer from all said spied data according to a type of use of said spied data, said buffer being configured to be sent to an external machine.

11. The secure electronic token according to claim 10, wherein the electronic token comprises an operating system and wherein said operating system comprises the specific means.

12. The secure electronic token according to claim 10, wherein the dedicated application comprises an exporting means configured to request the sending of the buffer to an external machine.

13. The secure electronic token according to claim 10, wherein said dedicated application comprises a checking means configured to detect that the buffer has reached a preset threshold.

14. The secure electronic token according to claim 10, wherein the specific means is automatically activated when the dedicated application is loaded or installed into the electronic token.

15. The secure electronic token according to claim 10, wherein the specific means is automatically deactivated when the dedicated application is removed from the electronic token.

16. The secure electronic token according to claim 10, wherein the specific means comprises a preset identifier of the dedicated application.

17. The secure electronic token according to claim 10, wherein said secure electronic token is one of a UICC or a token which comprises SIM features.

18. The secure electronic token according to claim 10, wherein said specific means, which was embedded in the secure electronic token prior to issuance of said electronic token, is in an inactive state until said dedicated application is loaded and installed into the electronic token.

\* \* \* \* \*